US010015017B2

(12) United States Patent
Finlow-Bates

(10) Patent No.: US 10,015,017 B2
(45) Date of Patent: Jul. 3, 2018

(54) PROOF OF WORK BASED USER IDENTIFICATION SYSTEM

(71) Applicant: QUALCOMM Incorporated, San Diego, CA (US)

(72) Inventor: Keir Finlow-Bates, Kangasala (FI)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 14/683,006

(22) Filed: Apr. 9, 2015

(65) Prior Publication Data

US 2016/0301531 A1   Oct. 13, 2016

(51) Int. Cl.
| | | |
|---|---|---|
| *H04L 9/32* | (2006.01) | |
| *H04L 9/30* | (2006.01) | |
| *G06F 21/33* | (2013.01) | |
| *G06F 21/64* | (2013.01) | |

(52) U.S. Cl.
CPC ............ *H04L 9/3247* (2013.01); *G06F 21/33* (2013.01); *G06F 21/64* (2013.01); *H04L 9/30* (2013.01); *H04L 9/3226* (2013.01); *H04L 9/3239* (2013.01); *H04L 9/3242* (2013.01); *H04L 2209/24* (2013.01); *H04L 2209/72* (2013.01)

(58) Field of Classification Search
None
See application file for complete search history.

(56) References Cited

U.S. PATENT DOCUMENTS

| | | | |
|---|---|---|---|
| 7,600,255 B1 * | 10/2009 | Baugher | H04L 63/1458 370/242 |
| 7,761,711 B2 | 7/2010 | Winkler et al. | |
| 8,656,177 B2 | 2/2014 | Putz | |
| 9,495,668 B1 * | 11/2016 | Juels | G06Q 20/06 |
| 2007/0011453 A1 * | 1/2007 | Tarkkala | H04L 9/3013 713/168 |

(Continued)

FOREIGN PATENT DOCUMENTS

| | | | | |
|---|---|---|---|---|
| EP | 1612643 A2 | 1/2006 | | |
| EP | 3035589 A1 * | 6/2016 | ............ | G06F 21/30 |

(Continued)

OTHER PUBLICATIONS

International Search Report and Written Opinion—PCT/US2016/024064—ISA/EPO—dated Jun. 27, 2016.

(Continued)

*Primary Examiner* — Michael R Vaughan
(74) *Attorney, Agent, or Firm* — Hunter Clark PLLC

(57) ABSTRACT

Aspects of the disclosure are related to a method for verifying whether a message was digitally signed by a user. The example method comprises: receiving a public key of a public-key signature scheme and one or more pieces of plaintext identification information associated with the user; applying a hash scheme to a combination of the public key and the one or more pieces of plaintext identification information, the hash scheme yielding a hash result; determining whether the hash result satisfies one or more criteria; determining whether the public key is associated with the user based on the determination of whether the hash result satisfies the one or more criteria; and verifying a digital signature of the message with the public key.

26 Claims, 4 Drawing Sheets

(56) References Cited

U.S. PATENT DOCUMENTS

| | | | | |
|---|---|---|---|---|
| 2008/0095369 | A1* | 4/2008 | Lucidarme | H04L 41/08 380/277 |
| 2009/0034714 | A9* | 2/2009 | Boneh | H04L 9/0847 380/28 |
| 2011/0235799 | A1* | 9/2011 | Sovio | H04L 9/083 380/30 |
| 2014/0192976 | A1* | 7/2014 | Yoon | H04L 9/0847 380/44 |
| 2014/0344576 | A1 | 11/2014 | Johnson | |
| 2015/0237021 | A1* | 8/2015 | Sovio | H04L 63/0428 713/168 |
| 2016/0085955 | A1* | 3/2016 | Lerner | G06F 21/31 726/20 |
| 2016/0246976 | A1* | 8/2016 | Freed | H04L 9/0819 |

FOREIGN PATENT DOCUMENTS

| | | | | |
|---|---|---|---|---|
| GB | 2407236 A | * | 4/2005 | H04L 9/0844 |
| WO | 2008053072 A1 | | 5/2008 | |

OTHER PUBLICATIONS

Menezes A J., et al., "Chapter 11: Digital Signature" Handbook of Applied Cryptography, [CRC Press Series on Discrete Mathematices And Its Applications], CRC Press, Boca Raton, FL, US, pp. 425-488, Oct. 1, 1996 (Oct. 1, 1996), XP001525011, ISBN: 978-0-8493-8523-0 Retrieved from the Internet: URL: http://www.cacr.math.uwaterloo.ca/hac/ paragraph [11.2.2].

Jin C., et al., "A novel certificateless deniable authentication protocol," IACR Cryptology ePrint Archive, 2013, 24 pages.

Su S., et al., "A public key cryptosystem based on three new provable problems," Theoretical Computer Science, vols. 426-427, Apr. 6, 2012, pp. 91-117.

* cited by examiner

PROOF OF WORK BASED USER IDENTIFICATION SYSTEM

FIELD

The subject matter disclosed herein relates to public/private key pairs, and more particularly to methods, apparatuses, and systems for discovering public/private key pairs linked to personally-identifiable plaintext identification information without relying on a certificate authority.

BACKGROUNDS

A public-key signature scheme employs two mathematically linked keys—a public key and a private key. A user may generate a public/private key pair with relative ease, publish the public key, and keep the private key secret. The user may digitally sign messages by generating digital signatures of the messages using the private key. Anyone with the public key may verify the authenticity of a message by verifying the message and the associated digital signature using the public key.

People may receive identification numbers, such as a passport number, an identification card number, a social security number, a bank account number, or an insurance policy number, etc., from government agencies and other authorities. Similarly, employees may receive identification information, such as an employee number, or an employee user ID, etc., from employers. However, it is uncommon for government agencies, various authorities, or employers to issue public/private key pairs usable in a public-key signature scheme.

SUMMARY

Aspects of the disclosure are related to a device for determining whether a message was digitally signed by a user. The device performs operations comprising: receiving a public key of a public-key signature scheme and one or more pieces of plaintext identification information associated with the user; applying a hash scheme to a combination of the public key and the one or more pieces of plaintext identification information, the hash scheme yielding a hash result; determining whether the hash result satisfies one or more criteria; determining whether the public key is associated with the user based on the determination of whether the hash result satisfies the one or more criteria; and verifying a digital signature of the message with the public key.

DETAILED DESCRIPTION

Embodiments of the disclosure are related to a system and method for allowing a user to search for and discover a public/private key pair usable in a public-key signature scheme based on plaintext identification information. The owner of the public key may be verified based on the public key and the plaintext identification information that is associated with the owner without relying on a certificate authority. The user may use the private key to sign messages. Messages thus signed, which can be verified with the public key, carry increased reliability with respect to the identity of the author. For example, a user may discover a public/private key pair based on her passport number. The discovered key pair is therefore linked to her passport number. The user may then publish the public key and sign messages with the private key. The link between the passport number and the public key may be independently verified with relative ease with a predetermined method without reliance upon a certificate authority. Thus, compared to an unsigned message, a signed message that can be verified with the public key is more likely to have come from the user to whom the passport number belongs. Embodiments of the disclosure are based on the assumption that an attacker is less likely than an honest user to expend time and computational resources on the creation of a public/private key pair based on the honest user's plaintext identification information, especially when the honest user is an ordinary person. Therefore, the link between a public key and the plaintext identification information may be verified by verifying the proof of work performed to discover the public key.

A user may search for and discover a public/private key pair based on plaintext identification information by searching for a public/private key pair that, when combined with predetermined plaintext identification information and processed with a predetermined hash scheme, yields a hash result that satisfies one or more predetermined criteria, through a process of trial and error. The stricter the predetermined criteria required of the hash result are, the more work (e.g., time and/or computational resources) is required to discover the public/private key pair through the process of trial and error, and the higher the level of trust that may be accorded to the public key.

Figure 1:
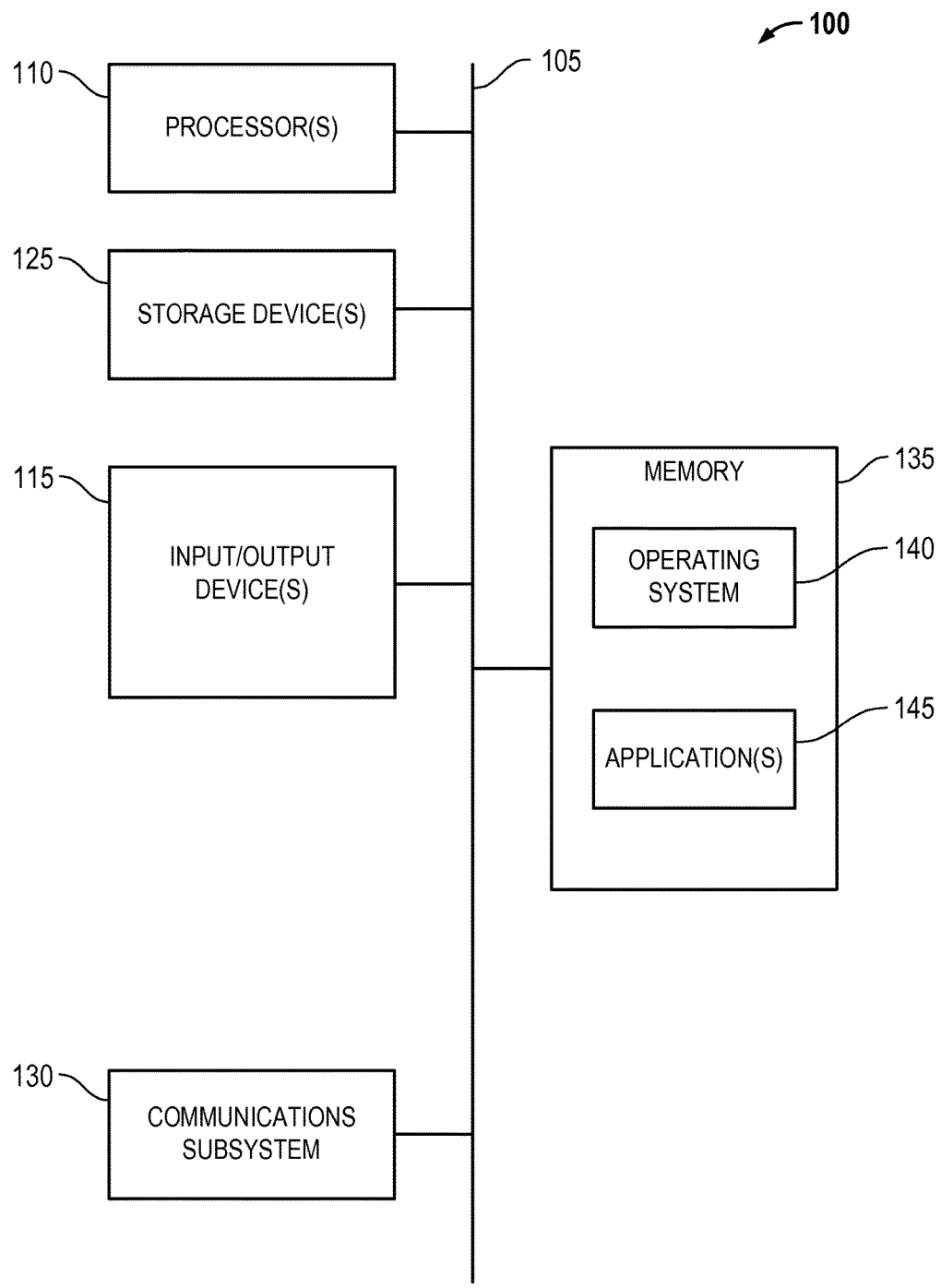
FIG. 1 is a diagram illustrating an embodiment of a device with which embodiments of the disclosure may be practiced.

An example device 100 is illustrated in FIG. 1. The device 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input/output devices 115, and can further include without limitation a mouse, a keyboard, a speaker, a printer, and/or the like.

The device 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The device 100 might also include a communication subsystem 130, which can include without limitation a modem, a network card (wireless or wired), an infrared communication device, a wireless communication device and/or chipset (such as a Bluetooth device, an 802.11 device, a Wi-Fi device, a WiMAX device, cellular communication facilities, etc.), and/or the like. The communications subsystem 130 may permit data to be exchanged with a network, other computer systems/devices, and/or any other devices described herein. In some embodiments, the device 100 may further comprise a working memory 135, which can include a RAM or ROM device, as described above.

The device 100 also can comprise software elements, shown as being currently located within the working memory 135, including an operating system 140, device drivers, executable libraries, and/or other code, such as one or more application programs 145, which may comprise or may be designed to implement methods, and/or configure systems, provided by other embodiments, as described herein. Merely by way of example, one or more procedures described with respect to the method(s) discussed below might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 125 described above. In some cases, the storage medium might be incorporated within a computer device, such as the device 100. In other embodiments, the storage medium might be separate from a computer device (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computerized device 100 and/or might take the form of source and/or installable code, which, upon compilation and/or installation on the device 100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 2:
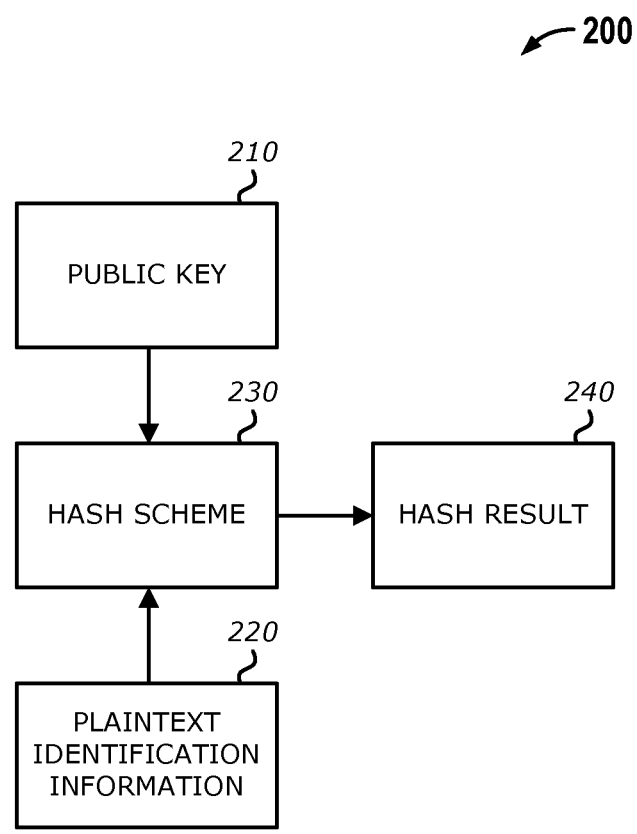
FIG. 2 is a diagram illustrating example elements involved in the generation of a hash result.

Referring to FIG. 2, an illustration 200 of elements involved in the generation of a hash result is shown. A public key 210 under test and predetermined plaintext identification information 220 are processed with a hash scheme 230 to yield a hash result 240. In other words, a hash scheme 230 is applied to a combination of the public key 210 under test and the predetermined plaintext identification information 220 to yield the hash result 240. The public key 210 is mathematically linked to a private key (not shown). For each public key 210 tested, it is determined whether the hash result 240 satisfies one or more predetermined criteria. If the hash result 240 satisfies the one or more predetermined criteria, the public key 210 and its associated private key are a successfully discovered public/private key pair. A successfully discovered public/private key pair may be referred to hereinafter as a conforming key pair, and the public key a conforming public key.

The public/private key pair comprising the public key 210 under test may be a key pair of any suitable public-key signature scheme. Non-limiting examples of public-key signature schemes include RSA, Digital Signature Algorithm (DSA), Elliptic Curve Digital Signature Algorithm (ECDSA), or ElGamal Signature scheme, etc. Other suitable public-key signature schemes may also be utilized.

The plaintext identification information 220 may include plaintext information that is personally identifiable and clearly associated with a user and may include one or more of a name, a government identification number, a passport number, a social security number, a bank account number, an insurance policy number, an employee identification number, a user ID, a password, or an e-mail address, etc., or any combination thereof. The list is illustrative and does not limit the disclosure.

The hash scheme 230 defines the following: 1) the number of hash operations that are performed, 2) the hash algorithm used in each hash operation, and 3) when and how the plaintext identification information 220 is combined with either the public key 210 under test or with an intermediate hash result. The hash algorithms may include, but are not limited to, BLAKE-256, BLAKE-512, ECOH, FSB, GOST, Grøstl, HAS-160, HAVAL, JH, MD2, MD4, MD5, MD6, RadioGatún, RIPEMD, RIPEMD-128, RIPEMD-160, RIPEMD-320, SHA-1, SHA-224, SHA-256, SHA-384, SHA-512, SHA-3, Scrypt, Skein, SipHash, Snerfru, Spectral Hash, SWIFFT, Tiger, or Whirlpool, etc., or any combination thereof. Any other suitable secure hash algorithms may also be utilized.

As non-limiting examples, a piece of plaintext identification information 220 may be combined with either the public key 210 under test or with an intermediate hash result by 1) concatenating the former to the beginning of the latter, 2) concatenating the former to the end of the latter, or 3) inserting the former into the latter at a particular location, or any combination thereof. These examples do not limit the disclosure, and other suitable methods for combining the plaintext identification information 220 with either the public key 210 under test or with an intermediate hash result may be utilized.

A hash scheme 230 that utilizes multiple pieces of plaintext identification information 220 may provide additional linkage between these pieces of plaintext identification information 220. For example, in one embodiment, a passport number and the passport holder's name may both be used in the hash operations. Thus, to verify a conforming public key, three pieces of information are required: the public key, the passport number, and the passport holder's name.

In one embodiment, for example, the hash scheme 230 may specify that: 1) two hash operations are to be performed; 2) the RIPEMD-160 hash algorithm is to be used in both hash operations; and 3) the employee number is to be concatenated to the end of the public key 210 under test, and the employee user ID is to be concatenated to the beginning of the intermediate hash result after the first hash operation.

Furthermore, as a non-limiting example, the one or more predetermined criteria may require that the hash result 240 include a particular predetermined string of characters/digits at a particular predetermined location. For example, the criteria may require that the hash result 240, when represented in decimal form, contain the string of digits "0000" at the beginning, or contain the string of digits "11111" at the end, or contain the string of digits "222222" after the 5th digit, etc. Any suitable criteria may be utilized.

In some embodiments, the hash result 240 may be required to contain plaintext identification information associated with the user. Any type of plaintext identification information may be utilized, and the plaintext identification information required here may be the same as, or may be different from, the plaintext identification information 220 used in the generation of the hash result 240. For example, in one embodiment, the predetermined criteria may require that the hash result 240, when represented in decimal form, end with the user's employee number.

It should be appreciated that even if the hash result 240 is required by the predetermined criteria to contain some plaintext identification information associated with the user, the hash scheme 230 should still require that at least one piece of plaintext identification information 220 be combined with either the public key 210 under test or with an intermediate hash result. Otherwise, an attacker may perform a generalized search against all plaintext identification information, that is, she may generate test public/private key pairs, perform one or more hash operations on the test public keys according to the hash scheme, and look for valid plaintext identification information for any person in the hash results. In this way, although the attacker cannot choose which person to attack, she may be able to discover a key pair that is associated with some person with relative ease, and fraudulently assume the identity of that person with the discovered key pair.

As explained above, the strictness level of the predetermined criteria required of the hash result 240 indicates the level of trust that may be accorded to a conforming public key because it takes more work (e.g., time and/or computational resources) to find a hash result 240 that satisfies stricter criteria. In embodiments where the criteria specify that the hash result 240, when represented in decimal form, must contain one or more predetermined strings of digits, the criteria may be made stricter by increasing the length of the required strings of digits. For example, the odds of finding a four-digit number in the hash result at a particular location with 100,000 hash tries is approximately 99.995%. Finding the same four-digit number preceded by a single leading "0" with the same number of hash tries has reduced odds of approximately 63.21%. Further, finding the same four-digit number preceded by four leading "0"s with the same number of hash tries has further reduced odds of approximately 0.09%. In one embodiment where the hash result 240 is required to end with the employee number, the criteria may be made stricter by requiring, for example, that the hash result 240 end with the employee number preceded by one or more leading "0"s (or followed by trailing "0"s, or preceded by leading "1"s, etc.). Therefore, for example, a conforming public key that yields a hash result that, when represented in decimal form, ends with the 5-digit employee number preceded by a single leading "0" may provide sufficient trust to be used to verify a signed document for a small transaction of an ordinary person. On the other hand, for a large transaction, or a transaction involving a celebrity or state leader, only a conforming public key that yields a hash result that, when represented in decimal form, ends with a 5-digit predetermined identification number preceded by 5 or even 10 leading "0"s may provide sufficient trust.

It should be appreciated that a third party intending to verify a conforming public key by verifying the proof of work and verify signed messages with the public key needs to have knowledge about the plaintext identification information 220 used, the hash scheme 230 used, and the criteria required of the hash result 240.

As an example, the public-key signature scheme used may be ECDSA; the hash scheme 230 may specify that: 1) two hash operations are to be performed; 2) the RIPEMD-160 hash algorithm is to be used in both hash operations; and 3) the employee number is to be concatenated to the end of the public key 210 under test, and the employee user ID is to be concatenated to the beginning of the intermediate hash result after the first hash operation. The predetermined criteria require that the hash result 240, when represented in decimal form, end with the employee number preceded by a single leading "0". A search for a conforming public/private key pair based on a fictional employee with an employee number of 98519 and a user ID of lwittgenstein was conducted on a typical personal computer. Therefore, the objective was to find a hash result that, when represented in decimal form, ends in "098519." The search lasted 49 hours and involved 598,000 hash operations, and the following conforming key pair and hash result were discovered successfully:

Private key: fabc983bbc5517238e4bee428bb463c7e4365 9d67f6e35195f36d77d859d969a
Public key: 0415db820e066c530cb2d87c34f2da1c15ec04f 752beec4dd7bedd03ed1184ea69e4a40f3 6a087d28450db 4740082367a911642f8b6d8cc0487ad778903cb405da
Hash result: 03d6f7e9759a5b3c6f4323d42b9a 803e56106217
Hash result in decimal form: 2192092796169484 8995018985472371397010845098519

A hypothetical three-week search using the same computer may yield, with a reasonable chance, a conforming key pair associated with a hash result that, when represented in decimal form, ends with the employee number preceded by 2 leading "0"s.

Figure 3:
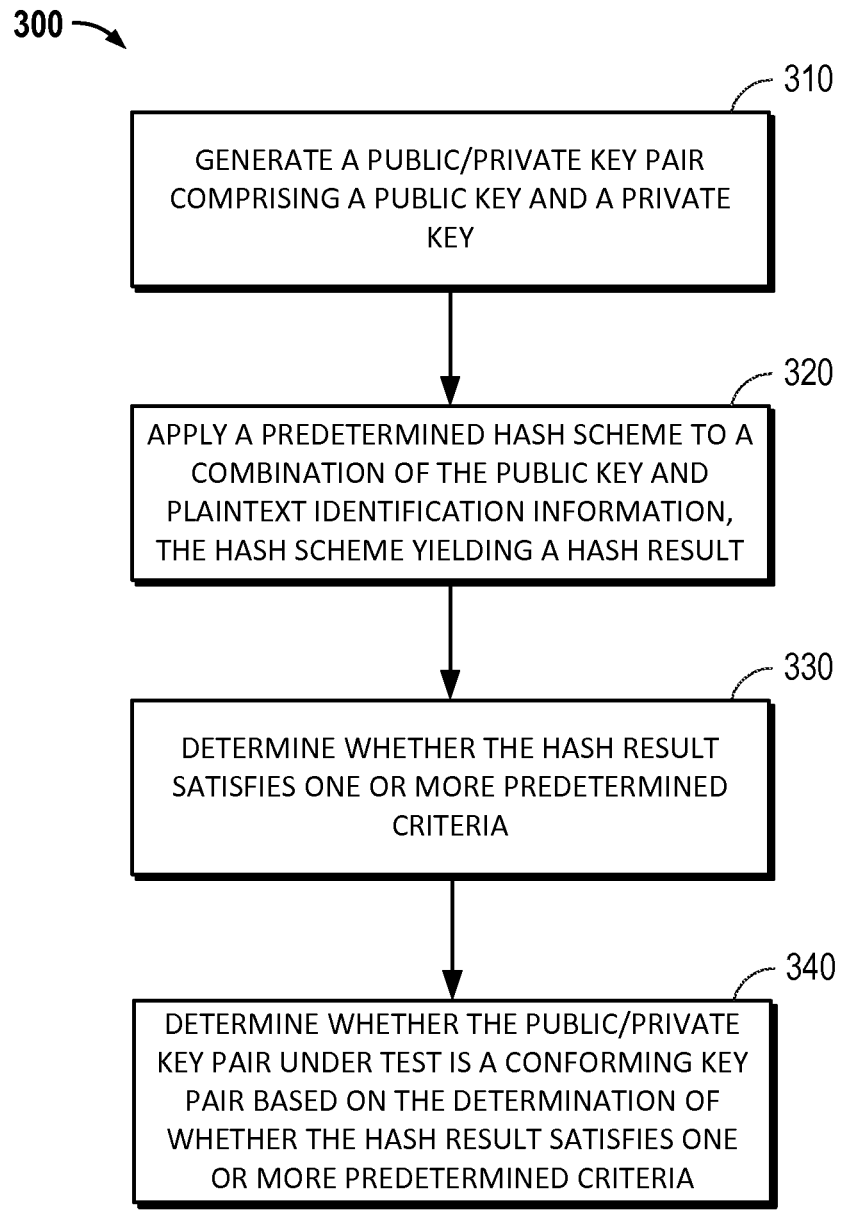
FIG. 3 is a flowchart illustrating an example method for testing a public/private key pair to determine whether the key pair is a conforming key pair.

Referring to FIG. 3, a flowchart illustrating an example method 300 for testing a public/private key pair to determine whether the key pair is a conforming key pair implemented with the device 100 is shown. At block 310, a public/private key pair of a public-key signature scheme may be generated, the public/private key pair comprising a public key and a private key. At block 320, a predetermined hash scheme may be applied to a combination of the public key and one or more pieces of plaintext identification information associated with a user, the hash scheme yielding a hash result. At block 330, it may be determined whether the hash result satisfies one or more predetermined criteria. At block 340, it may be determined whether the public/private key pair under test is a conforming key pair based on the determination of whether the hash result satisfies the one or more predetermined criteria. It may be determined that the public/private key pair is a conforming key pair in response to determining that the hash result satisfies the one or more predetermined criteria, and vice versa.

Figure 4:
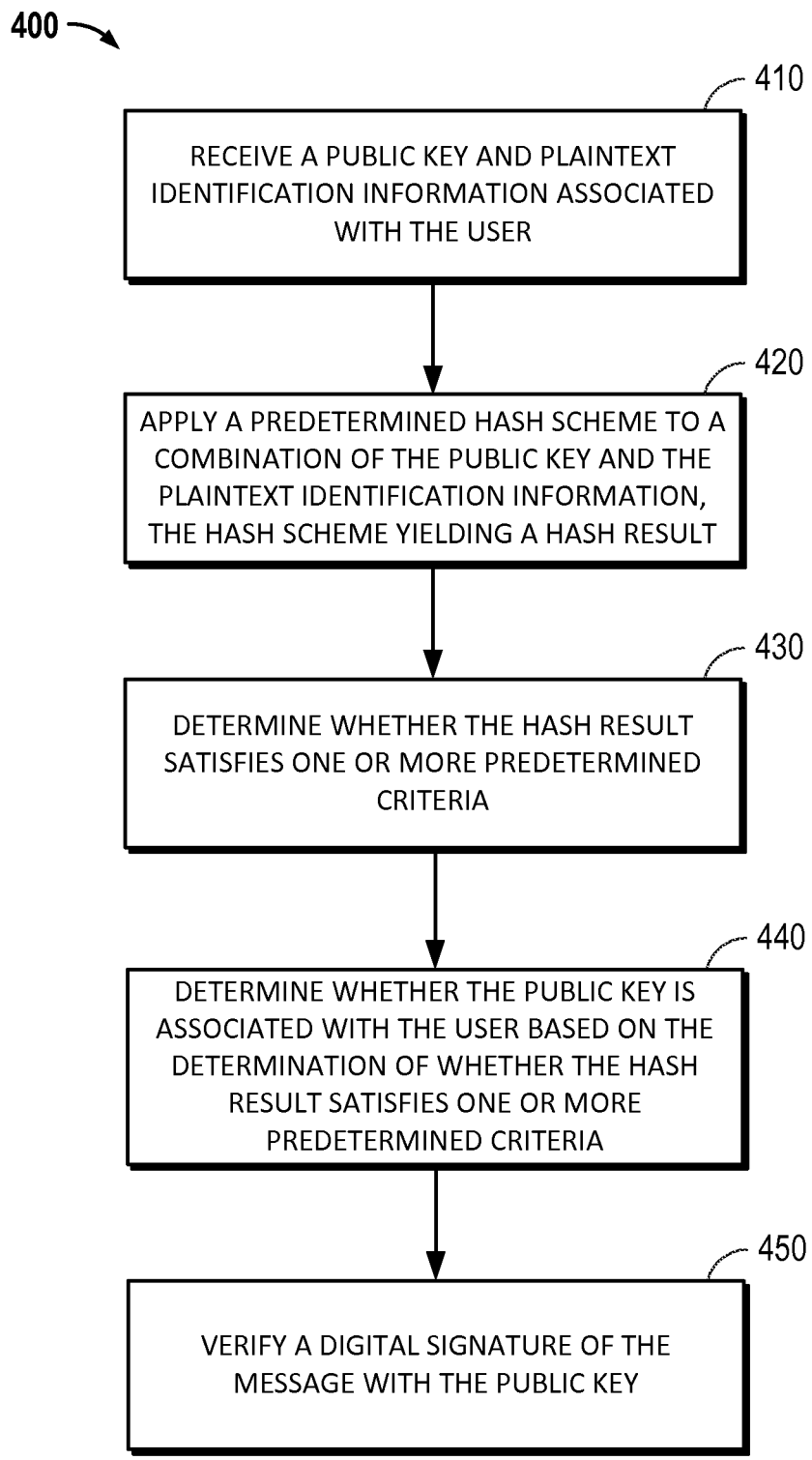
FIG. 4 is a flowchart illustrating an example method for determining whether a message was digitally signed by a user.

Referring to FIG. 4, a flowchart illustrating an example method 400 for determining whether a message was digitally signed by a user implemented with the device 100 is shown. At block 410, a public key of a public-key signature scheme and one or more pieces of plaintext identification information associated with the user may be received. At block 420, a predetermined hash scheme may be applied to a combination of the public key and the one or more pieces of plaintext identification information, the hash scheme yielding a hash result. At block 430, it may be determined whether the hash result satisfies one or more predetermined criteria. At block 440, it may be determined whether the public key is associated with the user based on the determination of whether the hash result satisfies the one or more predetermined criteria. It may be determined that the public key is associated with the user in response to determining that the hash result satisfies the one or more predetermined criteria, and vice versa. At block 450, a digital signature of the message may be verified with the public key based on the public-key signature scheme. Further, it may be determined whether the message was signed by the user based on the determination of whether the public key is associated with the user and the verification of the digital signature. It may be determined that the message was signed by the user when the public key is determined to be associated with the user and the verification of the digital signature of the message is successful. Otherwise, it may be determined that the message was not signed by the user.

Furthermore, embodiments of the disclosure are related to an apparatus 100 comprising a memory 135, and a processor 110 coupled to the memory 135, the processor configured to: receive a public key of a public-key signature scheme and one or more pieces of plaintext identification information associated with a user; apply a hash scheme to a combination of the public key and the one or more pieces of plaintext identification information, the hash scheme yielding a hash result; determine whether the hash result satisfies one or more predetermined criteria; determine whether the public key is associated with the user based on the determination of whether the hash result satisfies the one or more predetermined criteria; and verify a digital signature of a message with the public key.

The processor 110 may determine that the public key is associated with the user in response to determining that the hash result satisfies the one or more predetermined criteria, and vice versa. Furthermore, the processor 110 may determine that the message was signed by the user when the public key is determined to be associated with the user and the verification of the digital signature of the message is successful. Otherwise, the processor 110 may determine that the message was not signed by the user.

Therefore, by utilizing embodiments of the disclosure, a user may search for and discover a public/private key pair that is linked to one or more pieces of plaintext identification information associated with the user. The trial and error process involves testing public keys by applying a hash scheme to the public key under test and determining whether the hash result satisfies one or more predetermined criteria. The user may publish the conforming public key found and sign messages with the private key. A recipient of the message in possession of the public key, with knowledge about the plaintext identification information, the hash scheme, and the criteria, may independently verify that the public key is linked to the user by verifying the proof of work, and may verify that the user is the author of the signed message using the public key. No certificate authority is required either for the discovery of the public/private key pair or for the verification of the public key.

For example, based on an agreed-upon hash scheme and hash result criteria, a user may discover a public/private key pair based on a username and a password maintained with a bank, sign an instruction to the bank to pay a cell phone bill with the private key, and transmit the signed instruction and the public key to the bank. The bank may then verify that the public key is linked to the user based on the username, the password, the hash scheme, and the hash result criteria, and verify that the instruction has been signed by the user by verifying the digital signature of the instruction using the public key. In this way, the bank may have more confidence in believing that the instruction has come from the user than with an unsigned instruction. As a further example, based on an agreed-upon hash scheme and hash result criteria, a user may discover a public/private key pair base on her name and her driver license number, sign an instruction to the Department of Motor Vehicles (DMV) to update her address, and transmit the signed instruction and the public key to the DMV. The DMV may then verify that the public key is linked to the user based on the name, the driver license number, the hash scheme, and the hash result criteria, and verify that the instruction has been signed by the user by verifying the digital signature of the instruction using the public key. In this way, the DMV may have more confidence in believing that the instruction has come from the user than with an unsigned instruction.

It should be appreciated that aspects of the disclosure previously described may be implemented in conjunction with the execution of instructions (e.g., applications) by processor 110 of device 100, as previously described. Particularly, circuitry of the device, including but not limited to processor, may operate under the control of an application, program, routine, or the execution of instructions to execute methods or processes in accordance with embodiments of the disclosure (e.g., the processes of FIGS. 3 and 4). For example, such a program may be implemented in firmware or software (e.g., stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc.

Methods described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma1000, Wideband-CDMA (W-CDMA), and so on. Cdma1000 includes IS-95, IS-1000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma1000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

Example methods, apparatuses, or articles of manufacture presented herein may be implemented, in whole or in part, for use in or with mobile communication devices. As used herein, "mobile device," "mobile communication device," "hand-held device," "tablets," etc., or the plural form of such terms may be used interchangeably and may refer to any kind of special purpose computing platform or device that may communicate through wireless transmission or receipt of information over suitable communications networks according to one or more communication protocols, and that may from time to time have a position or location that changes. As a way of illustration, special purpose mobile communication devices, may include, for example, cellular telephones, satellite telephones, smart telephones, heat map or radio map generation tools or devices, observed signal parameter generation tools or devices, personal digital assistants (PDAs), laptop computers, personal entertainment systems, e-book readers, tablet personal computers (PC), personal audio or video devices, personal navigation units, wearable devices, or the like. It should be appreciated, however, that these are merely illustrative examples relating to mobile devices that may be utilized to facilitate or support one or more processes or operations described herein.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The herein described storage media may comprise primary, secondary, and/or tertiary storage media. Primary storage media may include memory such as random access memory and/or read-only memory, for example. Secondary storage media may include mass storage such as a magnetic or solid state hard drive. Tertiary storage media may include removable storage media such as a magnetic or optical disk, a magnetic tape, a solid state storage device, etc. In certain implementations, the storage media or portions thereof may be operatively receptive of, or otherwise configurable to couple to, other components of a computing platform, such as a processor.

In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating,", "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method for verifying whether a message was digitally signed by a user, comprising:
    receiving a public key of a public-key signature scheme and one or more pieces of plaintext identification information associated with a user;

applying a hash scheme to a combination of the public key and the one or more pieces of plaintext identification information, the hash scheme yielding a hash result;

determining whether the hash result satisfies one or more criteria;

determining whether the public key is associated with the user based on the determination of whether the hash result satisfies the one or more criteria, wherein the determination that the public key is associated with the user is indicative that the public key was discovered through a proof of work process based on the one or more pieces of plaintext identification information associated with the user, the hash scheme, and the one or more criteria; and verifying a digital signature of the message with the public key.

2. The method of claim 1, further comprising:
determining that the public key is associated with the user in response to determining that the hash result satisfies the one or more criteria.

3. The method of claim 1, further comprising:
verifying that the message was digitally signed by the user in response to determining that the public key is associated with the user and successfully verifying the digital signature of the message with the public key.

4. The method of claim 1, wherein the plaintext identification information is personally-identifiable identification information comprising at least one of: a name, a government identification number, a passport number, a social security number, a bank account number, an insurance policy number, an employee identification number, a user ID, a password, or an e-mail address.

5. The method of claim 1, wherein the hash scheme specifies: 1) a number of hash operations, 2) a hash algorithm used in each hash operation, and 3) when or how the public key and the plaintext identification information are combined.

6. The method of claim 1, wherein a level of trust accorded to the public key is determined based on a level of strictness of the criteria.

7. The method of claim 1, wherein the criteria comprise a requirement that the hash result, when represented in decimal form, end with a personally-identifiable identification number associated with the user.

8. The method of claim 7, wherein the criteria comprise a requirement that the hash result, when represented in decimal form, end with the personally-identifiable identification number preceded by one or more leading "0"s, wherein a level of trust accorded to the public key is determined based on a number of the leading "0"s.

9. An apparatus for verifying whether a message was digitally signed by a user, comprising:
a memory;
a processor coupled to the memory, the processor configured to:
receive a public key of a public-key signature scheme and one or more pieces of plaintext identification information associated with a user;
apply a hash scheme to a combination of the public key and the one or more pieces of plaintext identification information, the hash scheme yielding a hash result;
determine whether the hash result satisfies one or more criteria;
determine whether the public key is associated with the user based on the determination of whether the hash result satisfies the one or more criteria, wherein the determination that the public key is associated with the user is indicative that the public key was discovered through a proof of work process based on the one or more pieces of plaintext identification information associated with the user, the hash scheme, and the one or more criteria; and
verify a digital signature of the message with the public key.

10. The apparatus of claim 9, wherein the processor is further configured to:
determine that the public key is associated with the user in response to determining that the hash result satisfies the one or more criteria.

11. The apparatus of claim 9, wherein the processor is further configured to:
verify that the message was digitally signed by the user in response to determining that the public key is associated with the user and successfully verifying the digital signature of the message with the public key.

12. The apparatus of claim 9, wherein the plaintext identification information is personally-identifiable identification information comprising at least one of: a name, a government identification number, a passport number, a social security number, a bank account number, an insurance policy number, an employee identification number, a user ID, a password, or an e-mail address.

13. The apparatus of claim 9, wherein the hash scheme specifies: 1) a number of hash operations, 2) a hash algorithm used in each hash operation, and 3) when or how the public key and the plaintext identification information are combined.

14. The apparatus of claim 9, wherein a level of trust accorded to the public key is determined based on a level of strictness of the criteria.

15. The apparatus of claim 9, wherein the criteria comprise a requirement that the hash result, when represented in decimal form, end with a personally-identifiable identification number associated with the user.

16. The apparatus of claim 15, wherein the criteria comprise a requirement that the hash result, when represented in decimal form, end with the personally-identifiable identification number preceded by one or more leading "0"s, wherein a level of trust accorded to the public key is determined based on a number of the leading "0"s.

17. An apparatus for verifying whether a message was digitally signed by a user, comprising:
means for receiving a public key of a public-key signature scheme and one or more pieces of plaintext identification information associated with a user;
means for applying a hash scheme to a combination of the public key and the one or more pieces of plaintext identification information, the hash scheme yielding a hash result;
means for determining whether the hash result satisfies one or more criteria;
means for determining whether the public key is associated with the user based on the determination of whether the hash result satisfies the one or more criteria, wherein the determination that the public key is associated with the user is indicative that the public key was discovered through a proof of work process based on the one or more pieces of plaintext identification information associated with the user, the hash scheme, and the one or more criteria; and
means for verifying a digital signature of the message with the public key.

18. The apparatus of claim 17, further comprising:
means for determining that the public key is associated with the user in response to determining that the hash result satisfies the one or more criteria.

19. The apparatus of claim 17, further comprising:
means for verifying that the message was digitally signed by the user in response to determining that the public key is associated with the user and successfully verifying the digital signature of the message with the public key.

20. The apparatus of claim 17, wherein the hash scheme specifies: 1) a number of hash operations, 2) a hash algorithm used in each hash operation, and 3) when or how the public key and the plaintext identification information are combined.

21. The apparatus of claim 17, wherein a level of trust accorded to the public key is determined based on a level of strictness of the criteria.

22. A non-transitory computer-readable medium comprising code which, when executed by a processor, causes the processor to perform a method for verifying whether a message was digitally signed by a user comprising:
receiving a public key of a public-key signature scheme and one or more pieces of plaintext identification information associated with a user;
applying a hash scheme to a combination of the public key and the one or more pieces of plaintext identification information, the hash scheme yielding a hash result;
determining whether the hash result satisfies one or more criteria;
determining whether the public key is associated with the user based on the determination of whether the hash result satisfies the one or more criteria, wherein the determination that the public key is associated with the user is indicative that the public key was discovered through a proof of work process based on the one or more pieces of plaintext identification information associated with the user, the hash scheme, and the one or more criteria; and
verifying a digital signature of the message with the public key.

23. The non-transitory computer-readable medium of claim 22, further comprising:
code for determining that the public key is associated with the user in response to determining that the hash result satisfies the one or more criteria.

24. The non-transitory computer-readable medium of claim 22, further comprising:
code for verifying that the message was digitally signed by the user in response to determining that the public key is associated with the user and successfully verifying the digital signature of the message with the public key.

25. The non-transitory computer-readable medium of claim 22, wherein the hash scheme specifies: 1) a number of hash operations, 2) a hash algorithm used in each hash operation, and 3) when or how the public key and the plaintext identification information are combined.

26. The non-transitory computer-readable medium of claim 22, wherein a level of trust accorded to the public key is determined based on a level of strictness of the criteria.

* * * * *